United States Patent
Weh et al.

(10) Patent No.: US 10,668,910 B2
(45) Date of Patent: Jun. 2, 2020

(54) MASTER BRAKE CYLINDER FOR A HYDRAULIC VEHICLE BRAKE SYSTEM

(71) Applicant: Robert Bosch GmbH, Stuttgart (DE)

(72) Inventors: Andreas Weh, Sulzberg (DE); Harald Guggenmos, Immenstadt/Seifen (DE); Matthias Mayr, Rettenberg (DE); Stefan Kaserer, Ofterschwang (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 15/991,348

(22) Filed: May 29, 2018

(65) Prior Publication Data
US 2018/0345933 A1 Dec. 6, 2018

(30) Foreign Application Priority Data
May 31, 2017 (DE) .................. 10 2017 209 114

(51) Int. Cl.
| | |
|---|---|
| B60T 11/20 | (2006.01) |
| B60T 13/14 | (2006.01) |
| B60T 13/68 | (2006.01) |
| B60T 17/22 | (2006.01) |
| B60T 11/236 | (2006.01) |
| B60T 11/232 | (2006.01) |
| B60T 13/66 | (2006.01) |
| B60T 13/74 | (2006.01) |
| F16K 15/18 | (2006.01) |
| B60T 8/38 | (2006.01) |
| B60T 8/40 | (2006.01) |

(52) U.S. Cl.
CPC ............ *B60T 13/145* (2013.01); *B60T 11/20* (2013.01); *B60T 11/232* (2013.01); *B60T 11/236* (2013.01); *B60T 13/662* (2013.01); *B60T 13/686* (2013.01); *B60T 13/745* (2013.01); *B60T 17/221* (2013.01); *B60T 8/38* (2013.01); *B60T 8/4081* (2013.01); *F16K 15/18* (2013.01)

(58) Field of Classification Search
CPC ...... B60T 11/224; B60T 11/165; B60T 11/20; B60T 11/18; B60T 13/745; B60T 13/573
USPC .................................................. 60/562, 581
See application file for complete search history.

(56) References Cited

U.S. PATENT DOCUMENTS

| | | | | |
|---|---|---|---|---|
| 2,561,009 A | * | 7/1951 | Byers .................... | B60T 11/165 60/589 |
| 3,003,319 A | * | 10/1961 | Gordley ................ | B60T 11/103 60/534 |
| 3,800,541 A | * | 4/1974 | Sindelar ................ | B60T 11/165 60/588 |
| 3,802,199 A | * | 4/1974 | Hagberg, Jr. ......... | B60T 11/165 60/574 |

(Continued)

FOREIGN PATENT DOCUMENTS

GB 1456884 A * 12/1976 .............. B60T 11/20

*Primary Examiner* — Bradley T King
*Assistant Examiner* — Stephen M Bowes
(74) *Attorney, Agent, or Firm* — Norton Rose Fulbright US LLP; Gerard Messina

(57) ABSTRACT

A hydraulic block of a slip regulation of a hydraulic vehicle power brake system that has a master brake cylinder bore and forms a master brake cylinder. In order to prevent a hard impact of a piston of the master brake cylinder against an end stop when the master brake cylinder is released, in particular when there is an abrupt release, for example when the foot slides off a foot brake pedal, a hydraulic return damper that is integrated in the piston is provided.

14 Claims, 2 Drawing Sheets

(56) References Cited

U.S. PATENT DOCUMENTS

| | | | | |
|---|---|---|---|---|
| 6,062,654 A | * | 5/2000 | Becker | B60T 11/224 |
| | | | | 303/13 |
| 2011/0297493 A1 | * | 12/2011 | Vollert | B60T 7/042 |
| | | | | 188/106 R |
| 2014/0110217 A1 | * | 4/2014 | Cichon, Jr. | F16F 9/535 |
| | | | | 192/99 R |
| 2014/0152085 A1 | * | 6/2014 | Biller | B60T 8/4081 |
| | | | | 303/10 |

* cited by examiner

MASTER BRAKE CYLINDER FOR A HYDRAULIC VEHICLE BRAKE SYSTEM

CROSS REFERENCE

The present application claims the benefit under 35 U.S.C. § 119 of German Patent Application No. DE 102017209114.2 filed on May 31, 2017, which is expressly incorporated herein by reference in its entirety.

FIELD

The present invention relates to a master brake cylinder for a hydraulic vehicle brake system.

BACKGROUND INFORMATION

Conventional master brake cylinders have a so-called primary or rod piston that is capable of being displaced axially in a master brake cylinder bore of the master brake cylinder using a (foot) brake pedal or a (hand) brake lever, immediately or indirectly via a piston rod. This means that in order to actuate the master brake cylinder and a connected hydraulic vehicle brake system, the piston is displaced mechanically by muscular or assisted force in a direction of actuation in the master brake cylinder bore. Assisted force actuation refers to a displacement by muscular force amplified by a brake force booster. A return movement of the piston in the opposite direction normally takes place via a piston spring that is tensioned when the piston is displaced in the direction of actuation, and that applies force to the piston in a return direction of movement.

SUMMARY

An example master brake cylinder according to the present invention is provided for a hydraulic, slip-regulated vehicle power brake system. In accordance with the present invention, the example master brake cylinder has a master brake cylinder bore in which a piston is capable of being displaced axially through mechanical action. The word "mechanical" is intended to express that a primary or rod piston is meant, and not for example a second, so-called secondary or floating piston in a two-circuit master brake cylinder, displaced hydraulically by a pressure in the master brake cylinder bore, said pressure being produced by the one or first piston during its displacement in the master brake cylinder bore in the direction of actuation. The designation as "bore" does not mean that the master brake cylinder bore has to be produced by boring; rather, it can also be produced in some other manner, through machining or without cutting. The master brake cylinder according to the present invention has a return damper, in particular hydraulic, for the piston, which damps a return movement of the piston in a direction opposite the direction of actuation; i.e. in the direction of an unactuated position of the piston. The return damper damps the return movement of the piston in any case at the end before it reaches an unactuated position, so that the piston does not make a hard impact against a stop.

The present invention avoids damage and malfunctioning of a brake regulation or control electronics system and of sensors that could incorrectly recognize a desired braking by a vehicle driver in the case of a recoil impact of a piston making a hard impact against a stop. In addition, an impact noise of a piston impacting against a stop is avoided. An additional desirable effect is a hysteresis of the piston, whose return movement is braked or damped. In this way, when the brake is actuated a pedal feeling that is familiar from conventional master brake cylinders is achieved, in which a brake pedal follows a letup on the brake by a driver with a delay, and is not pressed against the braking foot by a spring.

Advantageous embodiments and developments of the present invention are described herein.

In a preferred embodiment of the present invention, the return damper is connected in non-detachable fashion to the piston of the master brake cylinder; i.e., the return damper cannot be detached from the piston without destruction. Because the return damper can be very significant for the proper functioning of an electronic brake regulation system, this embodiment of the present invention ensures that the return damper does not detach from the piston of the master brake cylinder. Preferably, the return damper is locked to the piston of the master brake cylinder, making assembly simple.

In particular, the master brake cylinder is provided as a hydraulic block of a brake regulation system of a hydraulic vehicle brake system, in particular of an external power brake system. Brake regulation is to be understood in particular as slip regulation, such as an anti-blocking, anti-slip, and/or driving dynamics regulation/electronic stability program, standardly abbreviated as ABS, ASR, FDR/ESP. Such slip regulation systems of hydraulic vehicle brake systems are known from passenger vehicles and motorcycles, and are not explained here in more detail. A brake regulation is for example also a regulation (or also controlling) of a wheel brake pressure and of a brake force of a power or assisted brake system. In this case, the master brake cylinder according to the present invention is a hydraulic block having the master brake cylinder bore and having receptacles for hydraulic components of the brake regulation, such as magnetic valves, check valves, hydraulic pumps, hydraulic storage units, damper chambers, and possibly, in a power brake system, a power brake cylinder bore for producing brake pressure using external force. In addition, the hydraulic block has connections for brake lines that lead to hydraulic wheel brakes of the vehicle brake system.

BRIEF DESCRIPTION OF THE DRAWINGS

Below, the present invention is explained in more detail on the basis of a specific embodiment shown in the figures.

The figures are simplified and schematic representations provided for the explanation and better understanding of the present invention.

DETAILED DESCRIPTION OF EXAMPLE EMBODIMENTS

Figure 1:
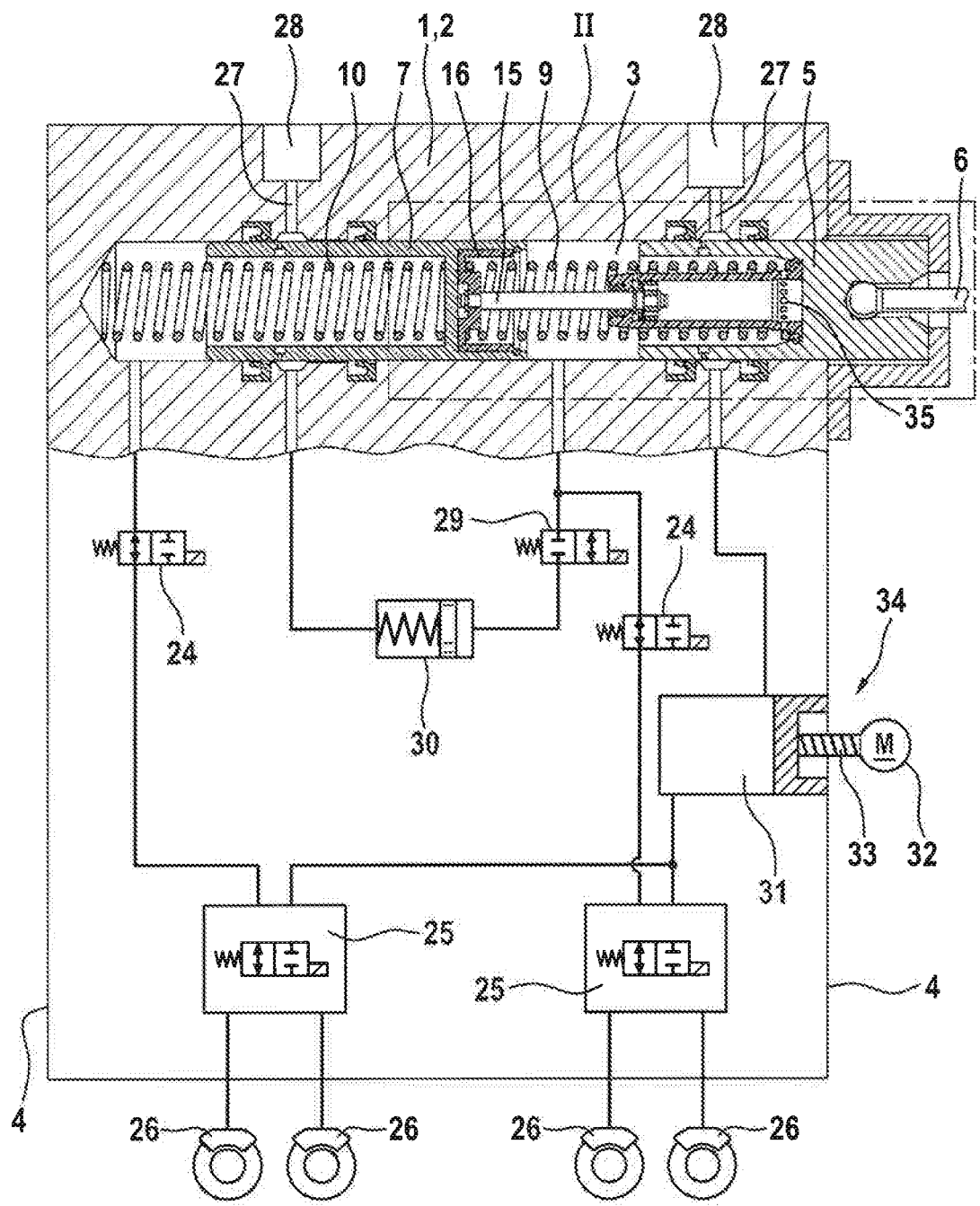
FIG. 1 shows a master brake cylinder according to the present invention in a front view, and sectioned in a midplane in the region of a master brake cylinder bore.

Master brake cylinder 1 according to the present invention, shown in FIG. 1, is fashioned as a hydraulic block 2 of a hydraulic power brake system of a vehicle, having slip regulation. Slip regulation systems are for example anti-lock, ant-slip, and/or driving dynamics regulation/electronic stability programs, standardly abbreviated as ABS, ASR, FDR/ESP. Hydraulic block 2 is a cuboidal metal block that is somewhat longer than it is wide, and is wider than its thickness by a multiple. FIG. 1 shows hydraulic block 2 in a front view of its two large sides, and is shown sectioned in the area of a master brake cylinder bore 3. A sectional plane is situated in a midplane between the two large sides of hydraulic block 2, and is at the same time an axial plane of master brake cylinder bore 3. In the sectioned and described specific embodiment of the present invention, master brake cylinder bore 3 is a blind hole. Differing from this, master brake cylinder bore 10 however also be made continuous from a [ . . . ] to an oppositely situated longitudinal side 4 of hydraulic block 2, and can for example have a seal at one end (not shown).

A piston 5 is accommodated so as to be capable of axial displacement in master brake cylinder bore 3, said piston being capable of being mechanically displaced axially in master brake cylinder bore 3 by a piston rod 6. Piston rod 6 is connected in jointed fashion to a foot brake pedal or hand brake lever (not shown), so that piston 5 can be displaced by muscular force or assisted force. Assisted force means displacement by muscular force amplified by a brake booster. Piston 5 is also designated the primary or rod piston hereinafter.

In master brake cylinder bore 3, on a side of the one piston 5 oriented away from piston 6, a further piston 7 is accommodated in axially displaceable fashion, the further piston being displaced by a hydraulic pressure in master brake cylinder bore 3 produced by the one piston 5 when it is displaced in a direction of actuation in master brake cylinder bore 3 for an actuation of master brake cylinder 1 and of the hydraulic vehicle brake system. The direction of actuation is oriented away from piston rod 6 and in the direction of further piston 7. In the following, further piston 7 is also designated secondary or floating piston. If only one piston is discussed, the one piston 5, i.e., the primary or rod piston, is meant. The two pistons 5, 7 are supported on one another with a helical pressure spring as piston spring 9, and further piston 7 is supported on a base of master brake cylinder bore 3, realized as a blind hole, by a helical pressure spring, as piston spring 10.

Figure 2:
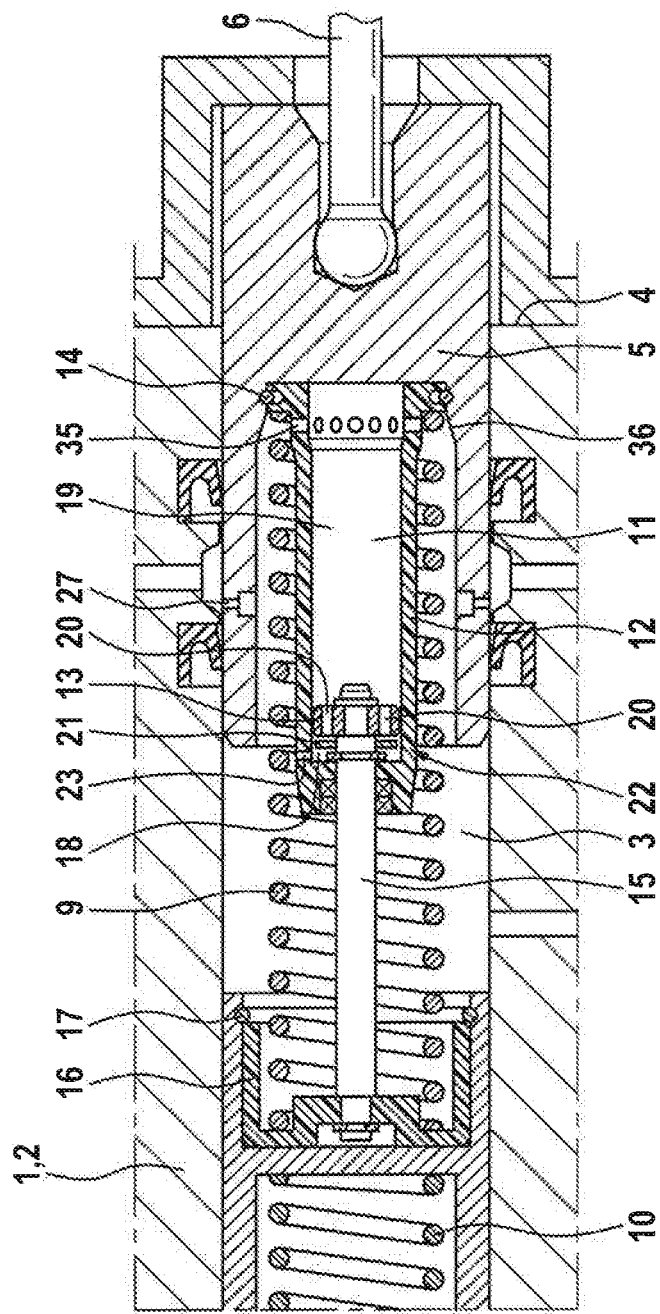
FIG. 2 shows an enlarged detail corresponding to rectangle II in FIG. 1.

The one piston 5 is realized as a hollow piston and a hydraulic return damper 11 is integrated therein, the damper being better visible in the enlarged detail of FIG. 2. Return damper 11 has a cylinder 12 in which a disk-shaped piston is situated so as to be axially movable, here designated separating element 13 in order to distinguish it from pistons 5, 7 of master brake cylinder 1. Cylinder 12 of return damper 11 is held in piston 5 by a securing ring 14 that engages in circumferential grooves in piston 5 and in cylinder 12. In the depicted and described specific embodiment of the present invention, the connection of cylinder 12 of return damper 11 to the one piston 5 of master brake cylinder 1 is non-detachable, i.e., cylinder 12 of return damper 11, and thus return damper 11, cannot be detached from piston 5 of master brake cylinder 1 without destruction. Piston 5 of master brake cylinder 1, realized as a hollow piston, has a hollow cone 36 on its inside. When assembled, securing ring 14 is situated in the groove of cylinder 12 of return damper 11, and is pushed together with cylinder 12 into piston 5 of master brake cylinder 1. Hollow cone 36 holds securing ring 14 in the groove of cylinder 12 of return damper 11 together elastically until securing ring 14 snaps into the groove in piston 5 of master brake cylinder 1. Securing ring 14 is then inaccessible, and holds cylinder 12 of return damper 11 in non-detachable fashion in piston 5 of master brake cylinder 1. The non-detachable snapping in of securing ring 14 in the groove in piston 5 can also be understood as a locking of cylinder 12 of return damper 11 with piston 5 of the master brake cylinder.

Separating element 13 of return damper 11 is configured axially fixedly on a piston rod 15 that is connected axially fixedly to further piston 7 of master brake cylinder 1. In the depicted and described specific embodiment of the present invention, piston rod 15 is fastened, with a bowl-shaped rod mount 16, in a countersunk recess on the end face of the other piston 7, which is held in the recess by a securing ring 17 that engages in a circumferential groove in further piston 7. The connection of piston rod 15 of return damper 11 to further piston 7 of master brake cylinder 1 is non-detachable, and bowl-shaped rod mount 16 can no longer be withdrawn from further piston 7 without destruction when securing ring 17 is snapped into the circumferential groove in further piston 7. Here as well, rod mount 16 of piston rod 15 of return damper 11 is locked to the other piston 7 of master brake cylinder 1; i.e. is non-detachably connected by plugging together. The fastenings of cylinder 12 of return damper 11 in the one piston 5, of rod mount 16 in the other piston 7, and of piston rod 15 have radial play, so that return damper 11, which connects the two pistons 5, 7 to one another, does not prevent radial movement and tilting of the two pistons 5, 7 relative to one another. Master brake cylinder bore 3 orients the two pistons 5, 7 so as to be aligned with one another, and return damper 11 does not overdetermine them.

Separating element 13 in cylinder 12 of return damper 11 divides an interior space of cylinder 12 into two chambers 18, 19. When the two pistons 5, 7 move axially against one another, separating element 13 of return damper 11 is displaced in cylinder 12, causing the volumes of the two chambers 18, 19 to change in opposite directions. This means that one of the two chambers 18, 19 becomes larger and the other chamber 19, 18 becomes smaller. Separating element 13 of return damper 11 has inlets 20, situated around piston rod 15, through which brake fluid flows from the one chamber 18, 19 into the other chamber 19, 18 when separating element 13 is displaced in cylinder 12. On a side of separating element 13 of return damper 11 facing further piston 7 of master brake cylinder 1, there is situated a perforated disc having a center hole and not having eccentric holes, as blocking element 21 of a plate valve, which can generally also be understood as check valve 22. When separating element 13 of return damper 11 moves in cylinder 12 in the direction of further piston 7 of master brake cylinder 1, blocking element 21 blocks inlets 20, so that no brake fluid can flow from the one chamber 18 into the other chamber 19 of return damper 11. When separating element 13 of return damper 11 moves in the opposite direction, blocking element 21 lifts off from separating element 13 and releases inlets 20, so that brake fluid can flow from the other chamber 19 into the one chamber 18.

A chamber 18, facing further piston 7 of master brake cylinder 1, in cylinder 12 of return damper 11 has a radial bore as a throttle 23. Brake fluid can flow from the other chamber 19 into chamber 18 through check valve 22. On an end remote from further piston 7, the other chamber 19 has radial bores 35 distributed over a circumference, through which bores brake fluid can flow from master brake cylinder bore 3 into the other chamber 19 with a low flow resistance.

Master brake cylinder bore 3 communicates, through a separating valve 24 between the two pistons 5, 7 and through a separating valve 24 between the further piston 7 and the base of master brake cylinder bore 3, and through wheel brake pressure modulation valve systems 25, with hydraulic wheel brakes 27 that are connected to hydraulic block 2 by brake lines, said block forming master brake cylinder 1. Moreover, master brake cylinder bore 3 communicates through orifice bores 27 with connections 28 for a brake fluid reservoir (not shown). Pistons 5, 7 form slide valves that seal orifice bores 27 when they are displaced from their depicted, unactuated positions in a direction of actuation. Master brake cylinder 1 is a two-circuit master brake cylinder to which wheel brakes 26 are connected, divided into two brake circuits that are hydraulically separate from one another.

Between the two pistons 5, 7, a cylinder-piston unit having a spring-actuated piston is connected to master brake cylinder bore 3 by a simulator valve 29, the cylinder-piston unit forming a pedal path simulator 30. A side of pedal path simulator 30 oriented away from simulator valve 29 communicates, through a relief bore, with one of the connections 28 for the brake fluid reservoir.

For a production of brake pressure when there is an operational braking using power assistance, hydraulic block 2 has a cylinder-piston unit 31 whose piston can be displaced by an electric motor 32 via a screw drive 33. This cylinder-piston unit 31, having electric motor 32 and screw drive 33, is here designated power brake force pressure producer 34. Power brake force pressure producer 34 receives brake fluid through one of the connections 28 from the brake fluid reservoir (not shown), and hydraulic wheel brakes 26 are connected to power brake force producer 34 by wheel brake pressure modulation valve systems 25.

For an operational braking, the one piston 5 of master brake cylinder 1, i.e. the so-called primary or rod piston, is displaced by muscular force by pushing down the foot brake pedal (not shown), and mechanically via piston rod 6, in a direction of actuation, i.e. in the direction of the base of master brake cylinder bore 3. The other piston 7, i.e. the secondary or floating piston, is also displaced in master brake cylinder bore 3 by brake fluid in master brake cylinder bore 3 between the two pistons 5, 7, or via piston spring 9 between the two pistons 5, 7. Both pistons 5, 7 of master brake cylinder 1 travel past orifice bores 29, and thereby hydraulically separate master brake cylinder bore 3 from the pressureless brake fluid reservoir (not shown). At the beginning of the pressing down of the foot brake pedal or the displacement of one of the pistons 5, 7, separating valves 24 are closed, so that no brake fluid can be impelled from master brake cylinder bore 3 in the direction of wheel brakes 26, and simulator valve 29 is opened, so that pedal path simulator 30 communicates with master brake cylinder bore 3 between the two pistons 5, 7.

Because, due to closed separating valve 24, further piston 7 can no longer impel brake fluid out of master brake cylinder bore 3, the piston does not move further; rather, as the foot brake pedal is further pushed down only the one piston 5 moves, and impels brake fluid out of master brake cylinder bore 3 into pedal path simulator 30. A hydraulic brake pressure is produced by power brake pressure producer 34, and wheel brake pressures in the wheel brakes 26 are controlled or regulated as a function of a displacement of the one piston 5 in master brake cylinder 1 with power force pressure producer 34, and/or with wheel brake pressure modulation valve systems 25, which can be understood as brake regulation.

Cylinder 12 of hydraulic return damper 11 integrated in piston 5 moves with piston 5, whereas the standing further piston 7 holds separating element 13 against being moved along with this motion via piston rod 15 fastened to piston 7. Separating element 13 is connected by piston rod 15 to further piston 7, and is connected via this piston to master brake cylinder 1. Immovably held separating element 13 moves relative to the two chambers 18, 19 in cylinder 12 of return damper 11, causing the volume of the one chamber 18 to become larger and the volume of the other chamber 19 to become smaller to the same degree. Here, blocking element 21 of return valve 22 is lifted off from inlets 20 in separating element 13, and brake fluid flows out of the chamber 19, which is becoming smaller, into chamber 18, becoming larger, of return damper 11.

If the foot brake pedal is released, and as a result piston 5 moves opposite the direction of actuation back in the direction of an unactuated position, separating element 13 moves relative to cylinder 12 in the direction opposite to that during actuation, causing the volume of the one chamber 18 to become smaller and the volume of the other chamber 19 to become larger. However, return valve 22 on separating element 13 blocks against a return flow of brake fluid from the one chamber 18 into the other chamber 19, so that the brake fluid has to flow through throttle 23 from the one chamber 18, whose volume becomes smaller during the return movement of piston 5, into master brake cylinder bore 3. Through radial bores 35, brake fluid flows out from master brake cylinder bore 3 into the other chamber 19 of return damper 11, whose volume becomes larger during the return movement of piston 5. The flowing out of brake fluid during the return movement of piston 5 from the one chamber 18 of return damper 11 through throttle 23 damps the return movement of piston 5. In particular when there is an abrupt release of the foot brake pedal, for example when the foot slides off the pedal, this prevents piston 5 from making a hard impact against an end stop of master brake cylinder 1, which limits the return movement of piston 5 and defines its unactuated position. This prevents damage to components, sensors, and electronics due to a hard impact of piston 5 and recoil of piston 5; the latter could cause faulty controlling of the power brake, because an electronic brake regulation system could incorrectly recognize a desired braking by a vehicle driver. In addition, an impact noise of piston 5, impacting against an end stop, is avoided. An additional desired effect is a hysteresis of piston 5, whose return movement is braked or damped. In this way, a pedal feeling that is familiar from conventional master brake cylinders is achieved when releasing the brake, a brake pedal following a yielding braking foot of a vehicle driver with a delay, and not being pressed against the braking foot by a spring.

When there is a failure of power brake pressure producer 34 or a disturbance of the electronic brake regulation system, an assisted braking takes place through actuation of master brake cylinder 1 with muscular force, separating valves 24 remaining open and simulator valve 29 remaining closed.

With wheel brake pressure modulation valve systems 25, a wheel-individual wheel brake pressure regulation, and thus a slip regulation, is possible in a conventional manner. This is conventional and is not further explained here.

Hydraulic block 2, forming master brake cylinder 1, is provided for a hydraulic power brake system having slip regulation. Separating valves 24, simulator valve 29, and valves of wheel brake pressure modulation valve systems 25 are magnetic valves that, like cylinder-piston unit 31 of power brake pressure producer 34 and pedal path simulator 30, are situated in receptacles in hydraulic block 2, and are connected to one another through a bore in hydraulic block 2, i.e., are connected to one another corresponding to a hydraulic circuit plan of the slip regulation. Electric motor 32 of power brake pressure producer 34 is attached externally, preferably on one of the large sides of hydraulic block 2. The magnetic valves, power brake pressure producer 34, and pedal path simulator 30 can also be generally understood as hydraulic components of the slip regulation. As stated, hydraulic block 2 forms master brake cylinder 1 according to the present invention and, when equipped with the named hydraulic components, forms a hydraulic aggregate which is the, or in any case one, core part of the power brake regulation system and of the slip regulation of the vehicle brake system. Slip regulation systems such as anti-blocking, anti-slip, and driving dynamics regulation or electronic stability programs, standardly abbreviated ABS, ASR, FDR, or ESP, are understood by those skilled in the art, as are their hydraulic blocks, and are therefore not described here in more detail.

What is claimed is:

1. A master brake cylinder for a hydraulic vehicle brake system, the master brake cylinder having a master brake cylinder bore in which a piston is mechanically displaced axially, wherein the master brake cylinder has a return damper that damps a return movement of the piston in a direction of an unactuated position in the master brake cylinder bore:
   wherein the piston is a hollow piston in which the return damper is situated; and
   wherein the return damper includes a cylinder in which a separating element is situated, the separating element being axially moveable in the cylinder, the cylinder being situated in a hollow portion of the piston, and wherein the return damper further includes a spring which surrounds the cylinder and which is situated at least partly in the hollow portion of the piston.

2. The master brake cylinder as recited in claim 1, wherein the return damper is a hydraulic return damper.

3. The master brake cylinder as recited in claim 1, wherein the return damper is connected in non-detachable fashion and locked to the piston of the master brake cylinder.

4. The master brake cylinder as recited in claim 1, wherein the return damper has a throttle through which brake fluid flows during the return movement of the piston, which fluid dampens the return movement of the piston.

5. The master brake cylinder as recited in claim 1, wherein the master brake cylinder is a hydraulic block of a hydraulic vehicle brake system having receptacles for hydraulic components of a brake regulation of the hydraulic vehicle brake system, and having connections for wheel brakes of the hydraulic vehicle brake system.

6. The master brake cylinder as recited in claim 1, wherein the spring is a helical spring.

7. The master brake cylinder as recited in claim 1, wherein the separating element is disk shaped.

8. The master brake cylinder as recited in claim 1, wherein the return damper has two chambers in the cylinder whose volumes change in opposite directions when there is a displacement of the piston in the master brake cylinder bore, and which communicate with one another through a valve that opens when there is a displacement of the piston in a direction of actuation in the master brake cylinder bore, and closes when there is a return movement, wherein the separating element includes inlets, and wherein the valve includes the separating element and a blocking element.

9. The master brake cylinder as recited in claim 8, wherein the valve is a return valve.

10. The master brake cylinder as recited in claim 8, wherein the return damper has a throttle through which brake fluid flows during the return movement of the piston, which fluid dampens the return movement of the piston.

11. The master brake cylinder as recited in claim 10, wherein one of the two chambers of the return damper has the throttle, the one of the two chambers having a volume which becomes smaller during the return movement of the piston.

12. The master brake cylinder as recited in claim 8, wherein the two chambers of the return damper are separated from one another by the separating element, wherein the separating element moves relative to the chambers when there is a displacement of the piston in the master brake cylinder bore, and the volumes of the two chambers change in opposite directions during the displacement.

13. The master brake cylinder as recited in claim 12, wherein the two chambers of the return damper move together with the piston, and the separating element is connected to a second piston that is axially displaceable in the master brake cylinder bore.

14. The master brake cylinder as recited in claim 13, wherein the separating element is connected to the second piston via a piston rod.

\* \* \* \* \*